UNITED STATES PATENT OFFICE.

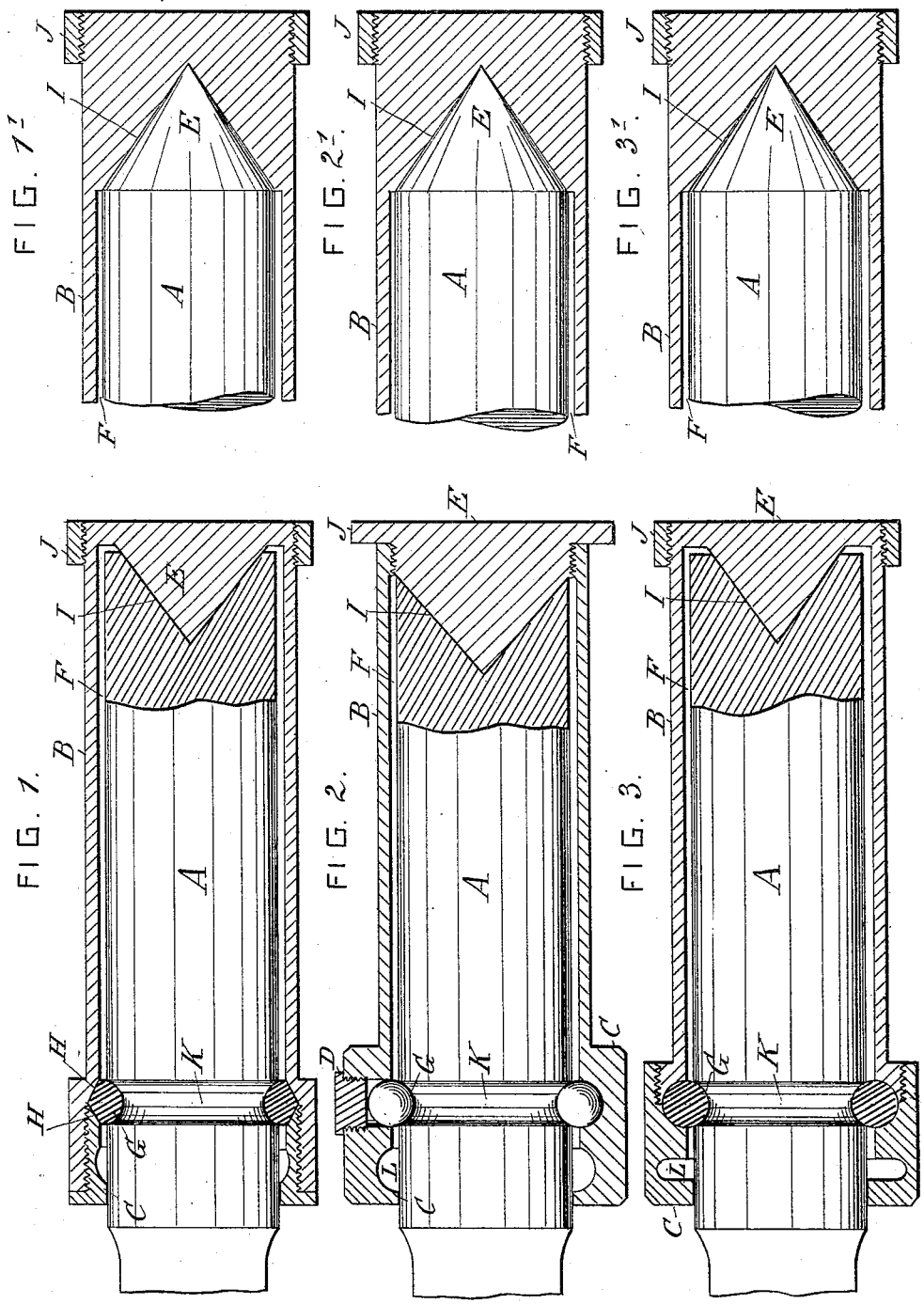
(No Model.) 2 Sheets—Sheet 1.
A. E. SMITH.
AXLE JOURNAL AND JOURNAL BEARING.
No. 454,075. Patented June 16, 1891.
WITNESSES
INVENTOR (No Model.) 2 Sheets—Sheet 2.
A. E. SMITH.
AXLE JOURNAL AND JOURNAL BEARING.
No. 454,075. Patented June 16, 1891.
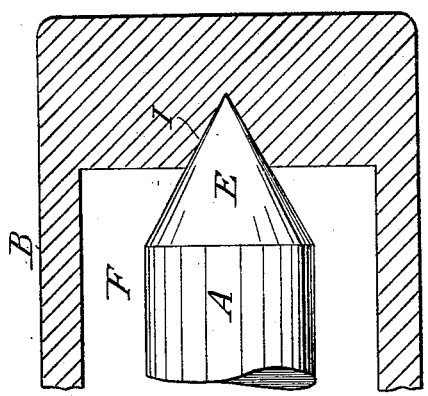
FIG. 4ᵃ
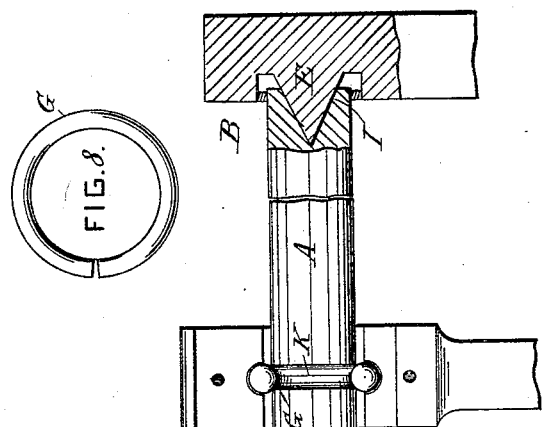
FIG. 8. FIG. 5.
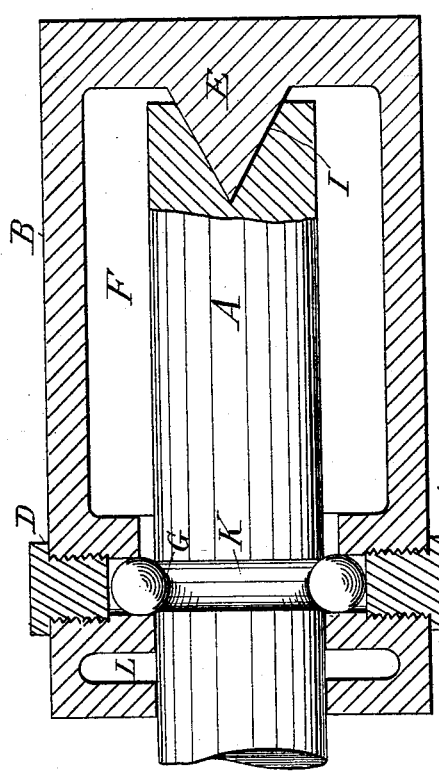
FIG. 4.
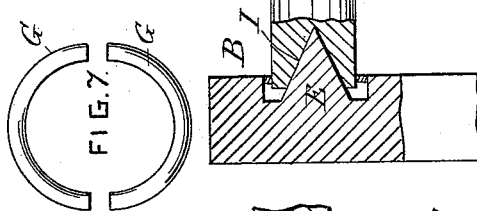
FIG. 7.
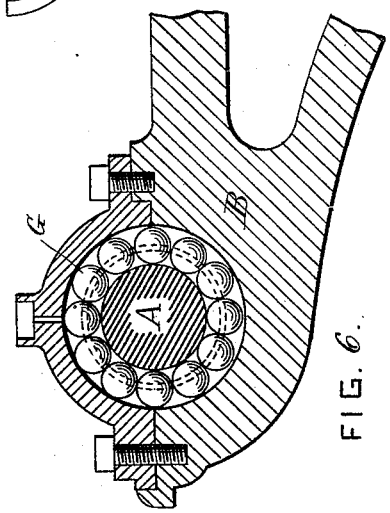
FIG. 6.
WITNESSES
Wᵐ A. Lowe
A. Joughmans.
INVENTOR
Alfred Smith

ALFRED E. SMITH, OF BRONXVILLE, NEW YORK.

AXLE-JOURNAL AND JOURNAL-BEARING.

SPECIFICATION forming part of Letters Patent No. 454,075, dated June 16, 1891.

Application filed February 17, 1890. Serial No. 340,728. (No model.)

*To all whom it may concern:*

Be it known that I, ALFRED E. SMITH, a citizen of the United States, residing at Bronxville, in the county of Westchester and State of New York, have invented new and useful Improvements in Axle-Journals and Journal-Bearings, of which the following is a specification.

The object of my invention is to make a journal or axle in combination with its bearings at a greatly-reduced cost as well as a greatly-reduced friction, making the journal by the combination to be stronger and more durable than any other known way, and providing it with a way of lubrication more efficient and desirable than any mode heretofore known.

In journal-bearings the great ends to be gained are strength and anti-frictional qualities, so that expense and power may be saved when used.

My object, then, is to combine a journal with its bearings that will increase its strength and reduce its friction without increasing cost.

Heretofore axles or axle-journals have been made at great cost of time, labor, and money, and the use of costly machinery. By my method the expense of manufacturing axles or axle-journals has been greatly overcome and friction greatly diminished.

The improvement is applied to journal-bearings generally, and particularly to carriage and railway-car axles as well as shafting. In carriage-axles the bearings generally extend along the entire journal, the bearing of the box impinging directly on the bottom of the journal on a line with its central part. On railway-car axles the box-bearings are upon the top side of their journals, the full weight of the car and its load resting upon the upper central line of bearing on the top of the axle-journal. Various ways have been devised and anti-friction bearings of expensive construction and material have been resorted to to diminish friction; but they have been and are of little avail, for the friction still causes the journals and bearings to get hot and often red-hot, causing the car-axles to bend, and by that means causing the cars to be thrown from the track, entailing loss of life and great destruction of property. By reducing the friction to a minimum, as my invention does, a vast amount of power, labor, and expense, besides the loss of limb and life, is saved from such accidents by the accidents being avoided.

By countersinking the front end of a journal and making a groove near its rear end and making a box or bushing with a conical or conoidal-shaped bearing projecting from the inner end of the box and protruding into the countersunk concavity in the outward end of the journal, or by making the end of the journal conical or conoidal, and countersinking the inner front end of the box for a bearing for a conical end of the journal and by drawing or pushing the box so that the cone in the box or at the end of the journal may rest in its countersunk concavity in the outer end of the journal or in the countersunk concavity at the inner end of the box and its rear part upon the upper or outer side or sides of a divided collar which lies in a groove near the rear end of the journal and is held to the journal and in the groove by a sleeve, cap, or hollow nut, which is screwed or secured fast to the axle-box until its end conforming to the outside surface of the revolving collar forms a groove for its upper side or sides to revolve in, or to a groove at the rear end of the journal and the journal-box, in conjunction with a hole at or near the end of the axle-box, into which balls are dropped of such a size that they will take the bearing, liberating the inner side of the box from the outer side of the journal and causing the bearing upon the balls to unite with the conical bearing at the front end of the journal. When the balls are in place, partly in a groove at the rear of the journal and partly in a groove at or near the rear end of the box, a bolt is screwed or secured into the hole in the box through which the balls have passed to keep the balls from falling out, making a revolving anti-frictional collar, prohibiting the bearing from being displaced and retaining the box to its axle or journal. When a journal is thus adjusted to its bearings, it is apparent that the friction is greatly reduced and that it is not necessary to finish the axles or journals in a lathe further than to countersink or make conical the outer ends of the journals and make a groove for the divided collar or balls to revolve in, for the inside diameter of the box being greater than the outside diameter of the journal requires no expense of labor and tools to finish either, and because of this feature a cavity or chamber is made between the box and the journal of such a capacity that once filled with lubricant it is retained for a long while. Journals thus made can be of a reduced length, aiding greatly in crowded streets the passing of vehicles. It also disposes of the necessity and expense of case-hardening, which is very much resorted to to reduce friction and wear, but which is a severe strain upon the iron or steel of which the journal or axle is made, and is frequently the cause of fracture.

My improvement can also be applied to shafting countersunk or made conical at each end and fitted with conical or conoidal projections extending from the lower end of the hanger at each end of the shafting into the countersunk concavities thereof, or the conical ends of the shafting may fit into the countersunk concavities at the lower end of the hangers, in which the ends of the shafting rest. At intermediate distances I place hangers grooved on the inner side of its box for the purpose of holding the divided collar or balls, which act as a support or a rest to the shafting and reduce its friction by revolving upon a divided collar or balls when the groove on the shafting corresponds with the groove in the hanger and the hanger-cap, and the revolving collars or balls are secured in their bed by the hanger-cap being secured to the hanger.

In order to make my invention more easily understood, Figure 1 will show a longitudinal section of an axle for vehicles countersunk at its front end to serve as a bearing for a conical projection protruding from the inner end of a box into a concavity in the front end of an axle having a divided collar lying partly in a groove at the rear end of the axle or journal and partly in a groove at the rear end of the box, made by recessed end of the box resting upon or against the upper side of the collar, and a hollow nut, sleeve, or cap screwed into or upon the rear end of the box for the purpose of holding the box upon and against the outer side of a divided collar.

Fig. 1' has the same conditions of Fig. 1, only the conical bearings are reversed. A shows axle-journal. B shows box; C, cap, sleeve, or hollow nut. G shows a divided collar; H, bearings of recessed end of box and sleeve upon the upper side of divided collar. K shows groove on journal. I shows countersunk bearing. E shows conical bearing or projection resting in countersunk bearing. F shows space for oil-chamber between the box and journal. J shows a ring around the front end of the box to keep the box in the hub of the wheel.

Fig. 2 shows a modification of Fig. 1, having a threaded conical nut or bolt screwed into the front end of a box to take the place of conical projection E and ring J, and having balls G interposed for a collar instead of a divided collar, as in Fig. 1, and held in place by screw-bolt D. L is a chamber for oil or dirt.

Fig. 2' has the same conditions as Fig. 2, only the conical bearings are reversed.

Fig. 3 shows another modification having a divided collar with the rear end of the box bearing upon part of the outside surface of the collar, and a cap C, with a sand-chamber screwed over the rear end of the box until its bearing upon the collar is equal to that at the end of the box upon the same, making a bearing to correspond with the bearing in groove K.

Fig. 3' has the same conditions as Fig. 3, only the conical bearings are reversed.

Fig. 4 shows another modification, which can be applied to railway-car axles, where the box is of different shape and proportions, but the bearings and connections practically the same, having countersunk or conical ends, which revolve around a conical projection protruding from the inner end of a box into the countersunk concavity in the outer end of the journal or into a countersunk concavity in the inner end of the box, and having a groove at its rear part, in conjunction with a groove in its box, with an inlet and outlet hole on the top and bottom side, through which balls are passed for the purpose of making a revolving collar to destroy friction and to hold the box to its bearings. Before placing the balls in the groove, bolt D' is screwed into the hole underneath the box, and at the bottom of the groove, for the purpose of retaining the balls, and when the groove around the journal and in the box is filled with balls bolt D is screwed into its hole on the top of the box to keep the balls in position, where they make an anti-frictional revolving collar, taking its bearing upon and in a groove on the journal and upon and in a groove in the box, creating thereby a large cavity for lubricant. A shows axle or journal. B shows box. G shows balls. D and D' show screw-bolts to keep balls in groove. K shows groove on journal. H shows groove in box. F shows oil-chamber. I shows countersunk bearings. E shows conical bearings projecting from the front end of box B into concavity I, where it rests. L shows sand-chamber. It is proper that the collar of the journal in the modification of railway-axles should revolve and be made of balls, so that they can be dropped in a hole on the top of the box, and passing into the groove settle around it until it is filled, and a collar of a revolving anti-frictional nature is made. A hole is made in the bottom of the box under the groove for the purpose of removing the balls by unscrewing bolt D'. I need not confine myself to a single groove filled with balls for a revolving collar. A number might be made; but as one collar is sufficient and much friction saved thereby it is wholly useless to make more than one collar to a single journal.

454,075

Fig. 4' has the same conditions as Fig. 4, only the conical bearings are reversed.

Fig. 5 shows a modification where shafting can be adapted to my improvements in journals and journal-bearings. A shows a line of shafting. B shows box at lower extremity of hanger. G shows balls or a divided collar. K shows groove in shafting. H shows groove in hanger-box. I shows countersunk concavity in ends of shafting. E shows conical projections from hanger-box in concavity I, or conical end of shafting in concavity at the inner end of the box.

Fig. 6 shows a vertical section of hanger and box.

Figs. 7 and 8 show divided collars.

I am aware that there has been devised a journal-bearing wherein the end of the journal is the frustum of a cone. In my device the bearing comes to a point and the socket is also made with a pointed bottom, so that the end-thrust is taken on the point of the journal, diminishing the friction and wear.

Having described my invention, what I claim is—

1. A journal and its box or bearing having at their outer ends a projection and socket and at their inner ends grooves, and an attaching device in said grooves, the journal and its box only having a bearing together at their ends, as set forth.

2. A journal and its box or bearing having at their outer ends a projection and socket and at their inner ends grooves, and a set of rollers in said grooves, as set forth.

ALFRED E. SMITH.

Witnesses:
A. JONGHMANS,
WM. WAGNER.